Patented July 2, 1929.

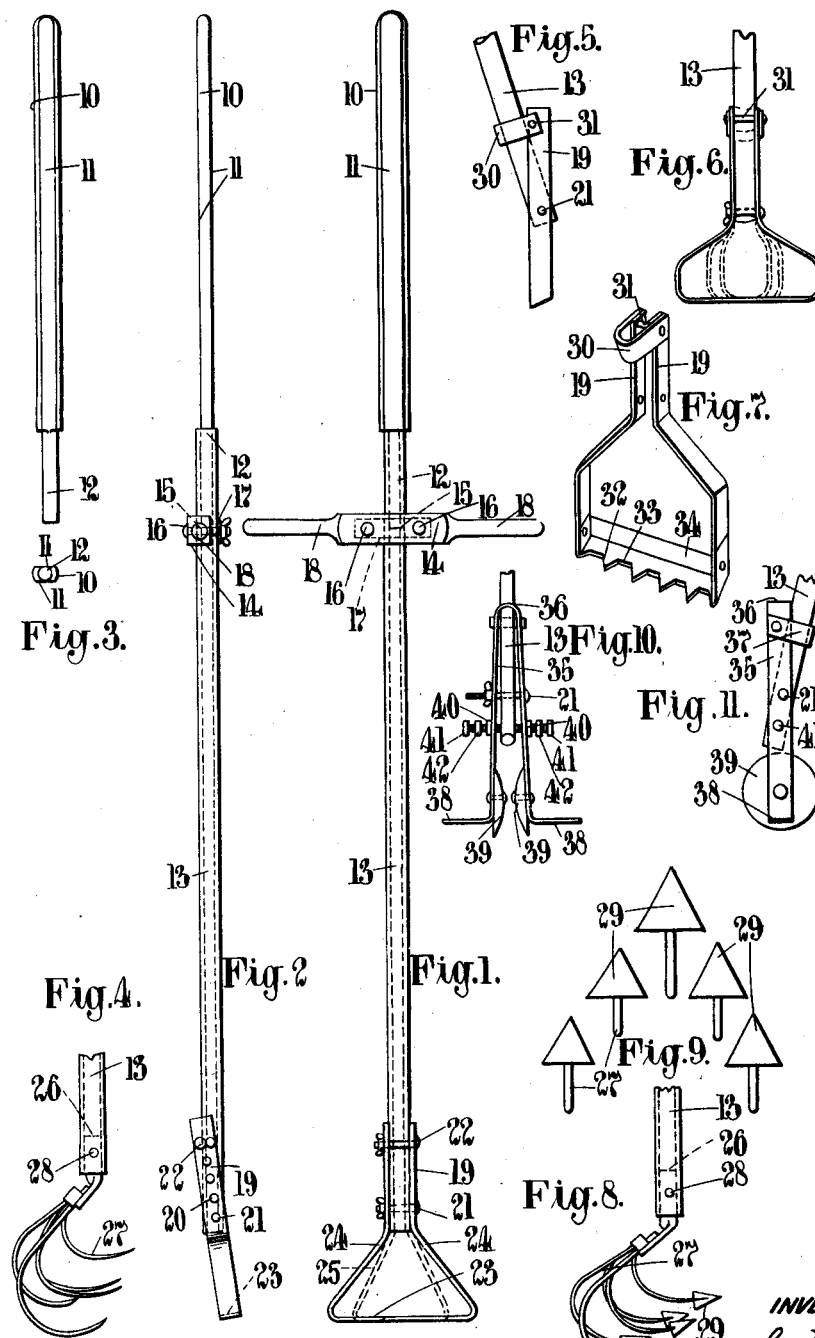

1,719,400

UNITED STATES PATENT OFFICE.

JOHN HAMPSON, OF LONDON, ENGLAND, ASSIGNOR TO THE SHOULDER HOE (HAMPSON'S PATENTS) COMPANY LIMITED, OF LONDON, ENGLAND, A BRITISH COMPANY.

AGRICULTURAL IMPLEMENT.

Application filed April 11, 1927, Serial No. 182,945, and in Great Britain October 11, 1926.

This invention relates to agricultural and other implements and has for its object to provide such devices which will be readily and efficiently operated and in which the strength of the operator is used to the greatest advantage.

In general implements made according to the invention comprise a fixed or movable tool or tools, operating part or the like attached by adjustable or other means to one end of an operating handle. This handle extends longitudinally and is formed in one or more portions. The upper end of the handle, that is the part remote from the tool or tools, is adapted to extend over the shoulder of the user, and is preferably formed with a broad surface of contact. This surface can be padded or otherwise cushioned if desired. At an intermediate position the handle is formed or provided with a cross handle extending on both sides thereof, the position of which is preferably adjustable.

This cross handle is so disposed and shaped that it can be grasped by the hands of the user whilst the longitudinally extending handle towards the upper end presses on the shoulder.

To give flexibility in action, the portion of the longitudinally extending handle which presses on the shoulder is preferably formed separate from the other portion of the said handle. This separate portion is preferably formed to have a slight degree of angular rotation with respect to the axis of the handle. By this means the portion pressing on the shoulder remains fixed, and the part of the handle coming below this portion can be rotated a slight angular extent around the axis of the handle in the manipulation of the tool or tools by the cross handle.

In order that the invention may be better understood it will now be described with reference to the accompanying drawings in which:—

Fig. 1 is a front elevation of one form of agricultural implement made according to the invention.

Fig. 2 is a side elevation of Fig. 1.

Fig. 3 is a front elevation and under plan of the upper portion of the handle.

Fig. 4 shews a portion of a side elevation similar to Fig. 2 but with another tool in position.

Fig. 5 is a similar view to Fig. 4 but illustrating another method of carrying the invention into effect.

Fig. 6 is a front elevation of Fig. 5.

Fig. 7 is a perspective view of another form of tool.

Fig. 8 shews a similar view to Fig. 4 with a modified form of tool shewn in that figure.

Fig. 9 is a somewhat diagrammatic under plan to an enlarged scale of the tool shown in Fig. 8, and Fig. 10 is a front elevation and Fig. 11 a side elevation of another form of tool.

The particular form of agricultural implement constructed according to the invention and shown in Figs. 1, 2 and 3 comprises a longitudinally extending handle formed in two parts. The upper of these parts 10 is preferably of wood and of substantially rectangular cross section, or in place of rectangular cross section, it may be formed of circular cross section with flats 11 at diametrically opposite positions as shown in Fig. 3. The lower end of this portion is formed with a spigot-like projection 12 which engages in the upper end of the other part 13 of the handle which is formed from a tubular metal portion of suitable internal diameter and of desired length.

This tubular metal portion 13 extends to and forms the lower part of the longitudinally extending handle and at its lower end has secured thereto in any suitable manner the tool or tools. In a modified construction, however, the tubular portion 13 does not extend to the lower end but an intermediate portion of wood is provided circular in cross section and adapted at its upper end to fit snugly within the lower end of the intermediate tubular portion. The lower end of this wooden portion fits into another short length of metallic tube which forms the lower end of the longitudinally extending handle.

A cross handle 14 of wood is provided on the part 13. This is of a substantially rectangular cross section as shewn at its centre portion and one side of the rectangle is notched or slotted at 15 to take round the tubular portion 13 of the handle. The cross handle 14 is secured to this portion 13 by means of bolts 16 passing through the rectangular part of the cross handle 14 on each side of the tubular portion 13 in co-operation with a strap of metal 17 which presses upon the tubular portion 13 which projects slightly from the slot or notch 15. Wing nuts are provided for securing the bolts 16 in position. At each end beyond the rectangular section portion of the cross handle 14 circular shaped extensions or hand grips 18 are formed.

Any desired implements such as coulters, ploughs, cultivators, hoes, weeders or otherwise may be fixed in an adjustable or other manner to the lower end of the longitudinally extending handle.

Simple and efficient tools for co-operation therewith to act as hoes for weeding, cleaning, dressing and similar purposes are formed as shown at the lower part of Figs. 1 and 2 from strip metal of desired gauge, width and length in the following manner. The strip is bent substantially to form three sides of a rectangle and the two parallel sides are then bent inwards until the upper edges come together and are further bent at an intermediate point of their length, so that from the ends they are parallel to these intermediate points. In these parallel portions 19 a number of aligned bolt holes 20 are formed. Through the lowermost of these bolt holes and through a corresponding cross bore at the lower end of the longitudinal handle part 13 a bolt 21 is passed and held in position by means of a nut to secure the tool in position. The adjustment of the tool is obtained by passing another bolt 22 through any pair of aligned bolt holes in the parallel portions 19 of the strip so that this bolt bears against the side of the handle.

In use, the portion 23 of the strip formed by the base between the two upright members constitutes the active portion of the tool and this may be formed with an edge or teeth to facilitate its action. The hands of the user grasp the hand grips 18 of the cross handle 14 and one flat surface 11 of the upper portion 10 of the longitudinal handle is disposed on the shoulder. Upon engaging the tool with the ground, the user walks backwards and by the downward thrust on the cross handle the tool performs the necessary operations. The manipulation is facilitated by turning the handle on its longitudinal axis by means of the handle 14, which turning takes place around the spigot 12 and thus the portion 10 of the handle coming on the shoulder does not turn. The turning action enables plants to be dressed around the stems on each side of a row of plants and a zig-zag or other similar path may be given to the tool. As the bolt 22 forming the adjusting means for the tool comes on the upper side of the handle the drag of the tool keeps it in the required adjusting position. The sides 24 of the tool extending from the actual operating portion 23 come at an acute angle to the said portion and consequently as the tool does not extend beyond this width, liability to damage plants and the like is minimized. The tool may be of any width and in Fig. 1 another tool of a similar construction but with a narrower operating portion is shewn in dotted lines at 25.

In the case of the tools such as described, the shank or shaft of a cultivator, hoe, plough or the like may be suitably attached to the handle for example, as shewn in Fig. 4 where the shank 26 of a cultivator 27 is fixed into the lower open tubular end of the handle portion 13 by a bolt 28 passing through the handle and shank to secure the parts in position.

In some cases a tool such as a cultivator may have combined therewith coulter or blade-like portions 29, for instance as shewn in Figs. 8 and 9 where such portions are shewn of triangular shape and formed integrally with the prongs of the cultivator.

The form of tool shewn in Figs. 5 and 6 is somewhat similar to that shewn in Figs. 1 and 2 but in Figs. 5 and 6 the upper ends of the parallel portions 19 are united together by a metallic strap 30 of somewhat U shape. At the ends of the U this strap is secured to the upper ends of the parallel portions 19 by means of a pin 31 riveted in position. The portion 13 of the handle when in position comes between the pin 31 and the bend of the U and this lower end is secured between the portions 19 by means of a bolt 21. The width of the tool may be according to the work to be done and in Fig. 6 a wide tool is shewn in full lines and two other narrower tools in dotted lines.

Another form of tool is shewn in Fig. 7. This again is somewhat similar to the forms shewn in Figs. 5 and 6 but in this case the actual operating part is formed with teeth 32 with gaps 33 between the teeth. The rear 34 of this operating blade comes at a desired angle to the portion having the teeth and this rear uprising part 34 thus causes the soil or the like loosened by the blade and teeth to rise a desired height before it falls over the top thereof. As a consequence with this tool an additional loosening and aerating of the soil is effected.

In some cases the implement may be employed for manipulating two tools simultaneously. This is of particular importance in agricultural implements and enables both sides of a row of plants, seedlings or the like to be operated upon at one time. The tools may be further so arranged that they are spaced apart in order not to damage or interfere in any way with the plants, seedlings or the like.

Such double tools may take many forms and may comprise two implements spaced laterally a desired distance apart so that one operates on one side of a row whilst the other simultaneously operates on the other side. In place of cultivators, forks or hoe members such as previously described may be employed or modified forms thereof adapted for their special purposes.

Figs. 10 and 11 shew one form of special double tool. In these figures, 13 is the lower portion of the longitudinally extending handle which has attached thereto by means of a bolt 21 a somewhat flattened inverted U shaped member 35 joined together at the top by a bend 36 and having a U member 37. It will be seen from Fig. 11 that the portion 13 of the handle lies between the bend 36 and in the bend of the U member 37. At the lower ends the limbs of the U member 35 have mounted to rotate on short stub axles two discs 39.

Just below the bolt 21 the limbs of the member 35 are formed or provided with bosses 40. These are formed with internal screw threads and have screwing thereinto screws 41, the ends of which come against the lower end of the part 13 of the handle. By screwing inwards the screws 41, after having loosened the nut on the bolt 21, the limbs of the inverted U member 35 are adapted to separate to a greater or less extent. They can be retained in any suitable position by means of lock nuts 42 which are screwed against the bosses 40. In this manner the discs 39 may be set at any desired distance apart.

In use the tool is of particular utility in the case of rows of seedlings, for example rows of sugar beet, as the discs 39 come on each side of a row of seedlings and the blades 38 operate on the soil at each side. By this method the soil on each side of a row of seedlings is treated at one operation and that without damaging the seedlings.

Although implements constructed according to the invention are particularly suitable for use by the upper portion of the longitudinal handle resting on the shoulder of the user and the user walking backwards, in some cases the implement can come behind the user and the upper portion of the handle rest upon the shoulder, or if forked rest upon both shoulders at the back of the user. In this case the adjustably positioned cross handle may be provided with integral or attached extensions coming substantially at right angles to the ends thereof and projecting towards the operator so that they come on each side of the operator and can be grasped by his hands. The general shape and disposition of the parts may also be modified for this method of use.

Where the work to be carried out by the agricultural or other implement is of a heavy nature, in some cases the tool or tools may be operated from two or more handles. In the case of two handles these may be branched outwardly and come at an angle so that one handle can come on the shoulder of one operator whilst the other handle comes on the shoulder of another operator, each operator controlling the hand grips of his own particular handle. With another arrangement where the implement is manipulated by two operators one handle may come at the back of a forward operator so that the upper end of his particular longitudinally extending handle comes on his shoulder at the back, whilst the other operator comes behind his particular handle, the action giving a tandem effect.

In all cases where required in order to obviate entirely the necessity for pressure being applied to the cross handle or to lessen such pressure, weight means may be associated with the tool or tools or the lower portion of the longitudinally extending handle. This weight means is designed to cause the tool or tools to be applied to the soil or the like with a required and definite pressure. The weight may be adjustable on the longitudinally extending handle to vary this pressure, or adjustable weighting means may be associated with the tool or handle.

When using the rearwardly disposed forms of the device, the operator walks forwardly and draws the implement behind him, the action being exactly the same as previously, that is to say the upper portion of the longitudinally extending handle presses on the shoulder, whilst the hands press the tool into the ground, the movement of the operator drawing the tool through the soil.

In this manner a great deal of work can be accomplished, especially work of that nature where it is not imperative that the operator should see the tool in action, in order to guide it.

A modified and simple means for securing the cross handle in position and suitable for co-operating with a cross handle of circular or other desired cross section, comprises a metal rod or wire of desired length and diameter bent to form a somewhat flattened U. The curve of the U is adapted to take around the longitudinally extending handle. The limbs of the U are bent in planes at right angles to the plane of the first bend and parallel to each other. These bends are adapted to receive a cross handle of circular cross section and the free ends of the rod or wire are screw threaded.

The arrangement and disposition of the parts is such that when the longitudinal handle is in position it lies in the first named bend of the U and between the ends of the rod or wire, whilst the cross handle comes into the two subsequently bent portions and against the surface of the longitudinally extending handle. To secure the parts in this position a strap is passed over the ends of the rod or wire and is secured in position by means of nuts. This clamps the longitudinal handle against the cross handle and secures the latter firmly in any required adjusted position.

Although the invention is particularly suitable for application to agricultural implements it is not limited thereto, but may be combined with implements for many other purposes. Amongst these for example may be mentioned sweepers and polishers, carpet cleaners and the like and any implement where pressure of the longitudinally extending handle on the shoulder of the user, and the manipulation of the implement by the cross handle, would be advantageous.

Although a longitudinally extending handle adapted to come on one shoulder only has been described, it is of course obvious that the upper end of the said handle can be divided or forked to rest upon both shoulders of the user.

To cushion the action of the upper portion of the longitudinally extending handle on the shoulder of the user, in some cases the upper portion which comes on the shoulder may be flexibly and resiliently connected to the portion coming immediately below. A simple method of effecting this mounting is to provide in the upper portion of the handle between the cross handle and the top, a strip spring portion connecting the upper portion that comes on the shoulder with the portion immediately below. In this manner any obstruction encountered by the tool or tools in place of transmitting a blow to the shoulder, would have the jar or shock absorbed to a large extent by the spring. In a somewhat more elaborate form of cushioning device the actual upper portion of the longitudinally extending handle may be in pivotal connection with the portion immediately below it and this upwardly extending portion may extend below the pivot and be united to the portion of the handle immediately below the pivot by means of a tension or other suitable spring, attached to the lower portion in the neighbourhood of the cross handle. By this means jars transmitted through the lower and intermediate portions of the handle communicate the jar to the upper portion of the handle through the pivot and as the uppermost portion of the handle has a downwardly extending portion, this uppermost portion acts as a lever, the fulcrum coming at the shoulder, and the spring absorbs the jar by allowing the uppermost portion to give to a slight extent. This form of the flexible mounting is of particular use where the operator is at the front of the implement. In place of the upper portion of the handle coming actually on the shoulder of the user, especially in this last mentioned case, the upper portion may be provided with a pad, plate or the like which comes on the back of the user to spread or distribute the pressure, over a comparatively large area.

The invention is not limited to the particular forms or constructional details described as these may be varied to suit particular cases.

What I claim as my invention and desire to secure by Letters Patent of the United States of America is:—

1. An implement of the type having a longitudinally extending handle and an operating tool and also having in an intermediate position, an adjustable cross handle, the upper end of the longitudinally extending handle when the cross handle is grasped by the hands being arranged to be forced into contact with the body of the user, the upper portion of the handle and the lower portion thereof being so connected together that the said lower portion, together with the tool attached thereto can be turned by means of the cross handle about the axis of the longitudinally extending handle with respect to the upper portion.

2. An implement as claimed in claim 1 in which the lower portion of the handle is tubular and in which the upper portion is provided with a spigot adapted to project into the tubular lower portion so that the latter can be turned thereon.

3. An implement as claimed in claim 1 in which the uppermost portion of the longitudinally extending handle is provided with a plate or the like of comparatively large area.

In witness whereof I affix my signature.

JOHN HAMPSON.